US012683917B2

(12) United States Patent
Feng et al.

(10) Patent No.: US 12,683,917 B2
(45) Date of Patent: Jul. 14, 2026

(54) METHOD AND ELECTRONIC DEVICE FOR MESSAGE NOTIFICATION BASED ON CLIENT ACTIVE STATUS

(71) Applicant: Beijing Zitiao Network Technology Co., Ltd., Beijing (CN)

(72) Inventors: Zifeng Feng, Beijing (CN); Ziqing Xu, Beijing (CN); Jianfeng Ni, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/573,995

(22) PCT Filed: Aug. 31, 2022

(86) PCT No.: PCT/CN2022/116107
§ 371 (c)(1),
(2) Date: Dec. 22, 2023

(87) PCT Pub. No.: WO2023/030372
PCT Pub. Date: Mar. 9, 2023

(65) Prior Publication Data

US 2024/0364646 A1 Oct. 31, 2024

(30) Foreign Application Priority Data

Aug. 31, 2021 (CN) ......................... 202111016286.9
Jul. 26, 2022 (CN) ......................... 202210887058.7

(51) Int. Cl.
*H04L 51/043* (2022.01)
*H04L 51/046* (2022.01)
*H04L 51/224* (2022.01)

(52) U.S. Cl.
CPC .......... *H04L 51/043* (2013.01); *H04L 51/046* (2013.01); *H04L 51/224* (2022.05)

(58) Field of Classification Search
CPC ... H04L 51/224; H04L 51/046; H04L 51/043; H04L 51/18; H04L 51/42; H04L 67/02;
(Continued)

(56) References Cited

U.S. PATENT DOCUMENTS 10,439,918 B1* 10/2019 Riggs .................. G06Q 10/107
2011/0060803 A1 3/2011 Barlin et al.
(Continued)

FOREIGN PATENT DOCUMENTS

CN 103313216 A 9/2013
CN 107526495 A 12/2017
(Continued)

OTHER PUBLICATIONS

International Search Report and Written Opinion for International Application No. PCT/CN2022/116107, mailed Nov. 30, 2022, 13 Pages.
(Continued)

*Primary Examiner* — Johnny B Aguiar

(57) ABSTRACT

The embodiments of the disclosure disclose a method, apparatus, device and storage medium for message notification, the method including: in accordance with a determination that a message is reachable for a plurality of clients of a user, determining a currently active client of the user; and notifying the message in a first notification mode at the currently active client, and notifying the message in a second notification mode at a currently inactive client. The disclosure enables the currently active client to receive a message from other clients and process rapidly by notifying the message is in a plurality of clients in accordance with a determination that a message is reachable for the plurality of clients of a user and notifying in different modes at the currently active client and the currently inactive client.

16 Claims, 9 Drawing Sheets

(58) Field of Classification Search
CPC ....... H04L 51/214; H04L 67/54; H04L 67/55; H04L 67/535
See application file for complete search history.

(56) References Cited

U.S. PATENT DOCUMENTS

| | | | | |
|---|---|---|---|---|
| 2011/0271202 | A1* | 11/2011 | Wong | G06Q 10/10 715/752 |
| 2014/0047019 | A1* | 2/2014 | Midtun | H04L 51/043 709/204 |
| 2014/0281870 | A1* | 9/2014 | Vogel | G06F 40/18 715/220 |
| 2015/0149567 | A1* | 5/2015 | Shmilov | H04L 67/54 709/206 |
| 2016/0156581 | A1* | 6/2016 | Li | H04L 67/306 709/206 |
| 2017/0230806 | A1* | 8/2017 | Shelkovin | H04L 67/535 |
| 2018/0270182 | A1* | 9/2018 | Li | H04L 51/224 |
| 2019/0087070 | A1* | 3/2019 | Pan | G06F 9/451 |
| 2023/0024748 | A1* | 1/2023 | Shetty | H04L 67/55 |

FOREIGN PATENT DOCUMENTS

| | | | |
|---|---|---|---|
| CN | 110752984 | A | 2/2020 |
| CN | 111045999 | A | 4/2020 |
| CN | 112199134 | A | 1/2021 |

OTHER PUBLICATIONS

First Office Action dated May 20, 2023 in CN Appl. No. 202210887058.7, English translation (18 pages).
Second Office Action dated Nov. 13, 2023 in CN Appl. No. 202210887058.7, English translation (37 pages).

* cited by examiner

IN ACCORDANCE WITH A DETERMINATION THAT A MESSAGE IS REACHABLE FOR A PLURALITY OF CLIENTS OF A USER, DETERMINE A CURRENTLY ACTIVE CLIENT OF THE USER ⟋ S11

NOTIFY THE MESSAGE IN A FIRST NOTIFICATION MODE AT THE CURRENTLY ACTIVE CLIENT, AND NOTIFY THE MESSAGE IN A SECOND NOTIFICATION MODE AT A CURRENTLY INACTIVE CLIENT ⟋ S12

- B   USER B MENTIONED YOU
          3 HOURS AGO

C   USER C MENTIONED YOU
        6 HOURS AGO

D   USER D @ YOU IN XXXXXXXXXXXX
        (DOCUMENT NAME)
        6 HOURS AGO

● ( B ) USER B ADDED A COMMENT

CONTENT OF THE COMMENT OF USER B......@USER A

3 HOURS AGO

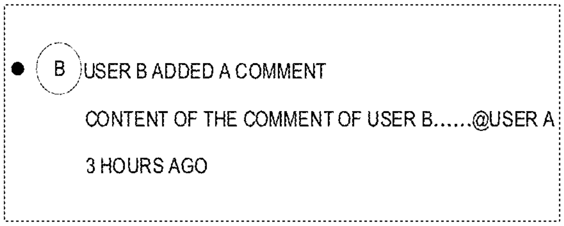

FIG. 7a

( C ) USER C ADDED A COMMENT

CONTENT OF THE COMMENT OF USER C......@USER A

6 HOURS AGO

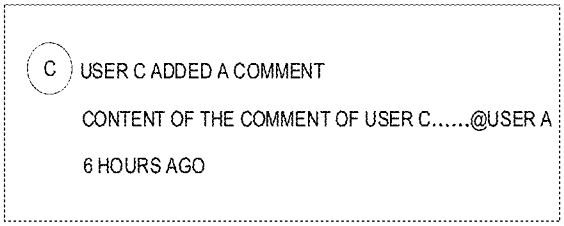

FIG. 7b

( D ) USER D ADDED A COMMENT IN XXXXXXXXXXXXX
      (DOCUMENT NAME)

CONTENT OF THE COMMENT OF USER D......@USER A

6 HOURS AGO

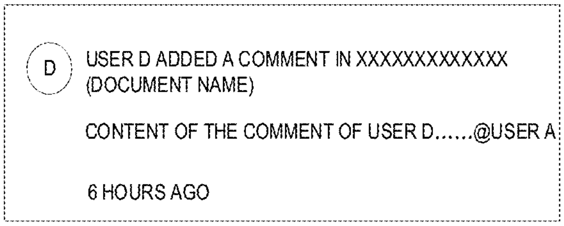

FIG. 7c

● ( B ) USER B ADDED A COMMENT

CONTENT OF THE COMMENT OF USER B......

3 HOURS AGO

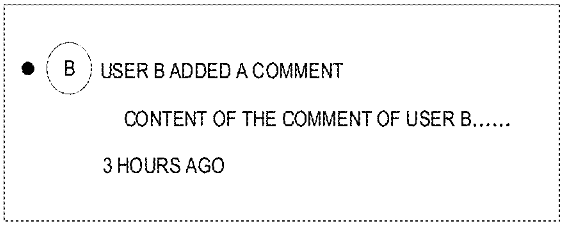

FIG. 8a

( C ) USER C ADDED A COMMENT

CONTENT OF THE COMMENT OF USER C......

6 HOURS AGO

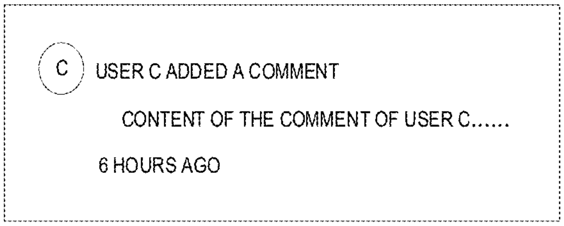

FIG. 8b

( D ) USER D ADDED A COMMENT IN XXXXXXXXXXXXX
(DOCUMENT NAME)

CONTENT OF THE COMMENT OF USER D......

6 HOURS AGO

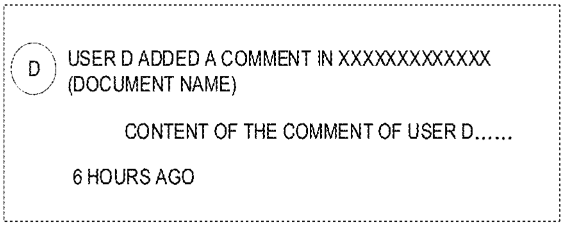

*FIG. 8c*

● ( B ) USER B ADDED A REPLY TO A COMMENT

CONTENT OF THE COMMENT OF USER B......

3 HOURS AGO

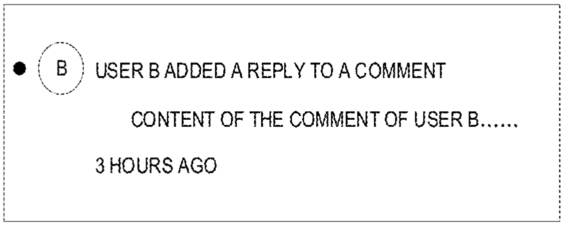

*FIG. 9a*

( C ) USER C ADD A REPLY TO A COMMENT

CONTENT OF THE COMMENT OF USER C......

6 HOURS AGO

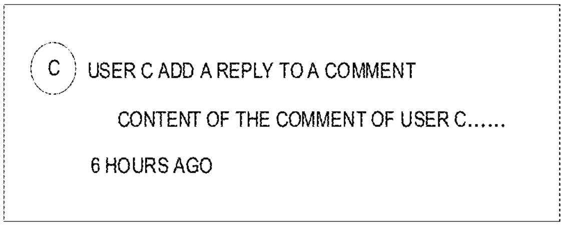

*FIG. 9b*

( D ) USER D ADDED A REPLY TO A COMMENT IN
XXXXXXXXXXXXX(DOCUMENT NAME)

CONTENT OF THE COMMENT OF USER D......

6 HOURS AGO

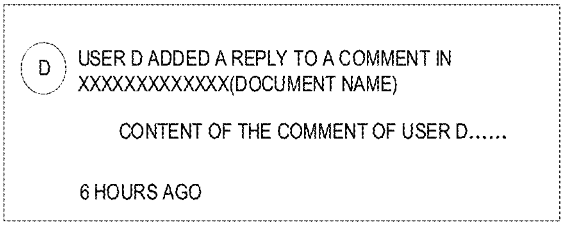

*FIG. 9c*

● ( B ) USER B RESPONDED TO YOUR COMMENT:

CONTENT OF THE COMMENT OF USER B......

3 HOURS AGO

*FIG. 10a*

D    USER D RESPONDED TO YOUR COMMENT IN
XXXXXXXXXXXXX(DOCUMENT NAME):

CONTENT OF THE COMMENT OF USER D......

6 HOURS AGO

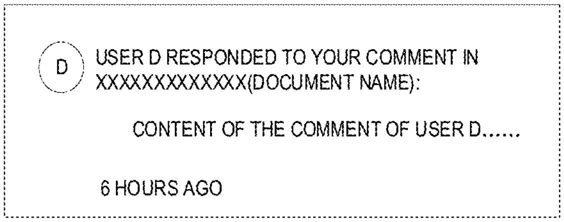

FIG. 10b

D    USER D RESOLVED A COMMENT IN
XXXXXXXXXXXXX(DOCUMENT NAME)

CONTENT OF THE COMMENT OF USER D ......

6 HOURS AGO

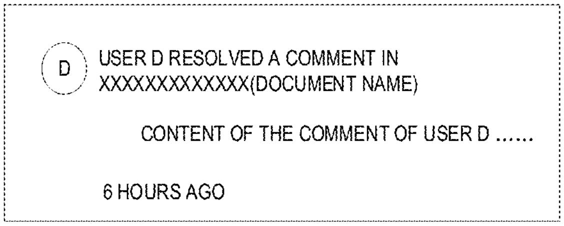

FIG. 11

☐    USER B AND USER A LIKED IN XXXXXXXXXXXXX
(DOCUMENT NAME)YESTERDAY

B    C

6 HOURS AGO

FIG. 12

● B    USER B ADDED A FULL TEXT COMMENT

CONTENT OF THE COMMENT OF USER B......

3 HOURS AGO

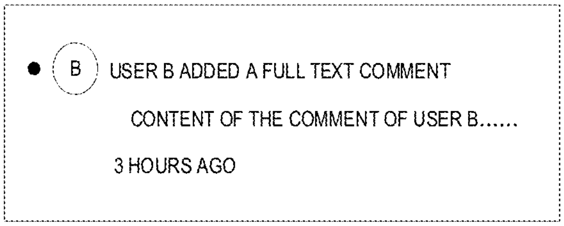

FIG. 13a

D    USER D ADDED A FULL TEXT COMMENT IN
XXXXXXXXXXXXX(DOCUMENT NAME)

CONTENT OF THE COMMENT OF USER D......

6 HOURS AGO

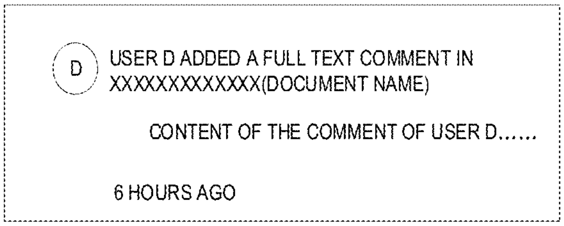

FIG. 13b

USER D ADDED A FULL TEXT COMMENT IN
XXXXXXXXXXXXX(DOCUMENT NAME)

CONTENT OF THE COMMENT OF USER D......

6 HOURS AGO

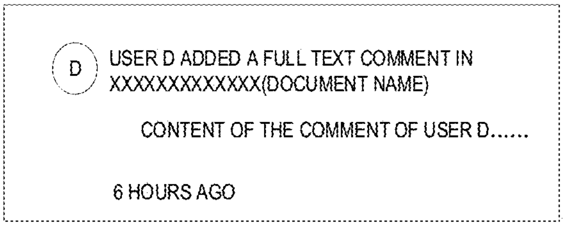

FIG. 13c

XXX　! THIS COMMENT HAS
　　　BEEN RESOLVED

XXXXXXXXXXXXXXXXXXXXXXXXXXXXXXXXXXXXXXXXXXXXXX

TEXT
NOTIFICATION　　　　　　　　　　ALL READ

USER 1 MENTIONED YOU
@USER A　CONTENT OF COMMENT 1......
3 HOURS AGO

USER 2 ADDED A COMMENT
CONTENT OF COMMENT 2......
3 HOURS AGO

THIS COMMENT HAS BEEN RESOLVED

3 HOURS AGO

USER 4 RESPONDED TO YOUR COMMENT
CONTENT OF COMMENT 4......
3 HOURS AGO

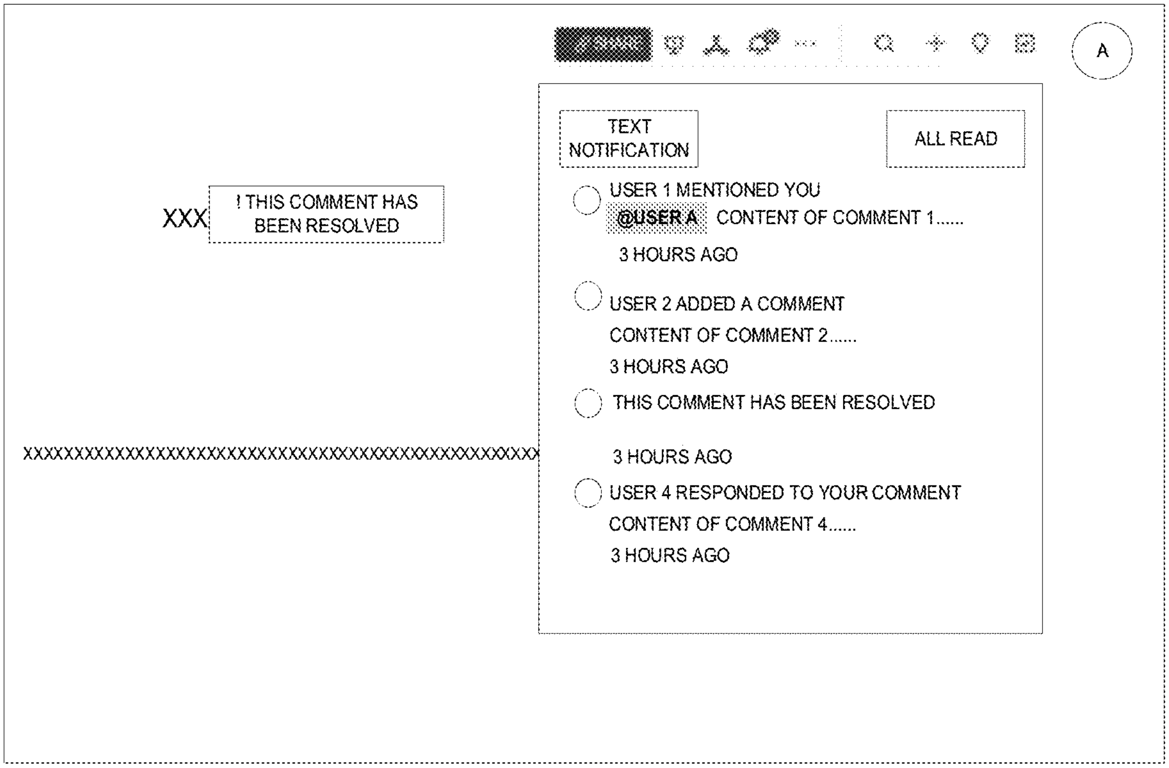

FIG. 14

COMMENT REMINDER

@USER C REOPENED A COMMENT IN DOCUMENTXXXXXXXXXXXXXXXXXXXXXXXXXXXXXXX
XXXXXXXX:..........................................................................................................................

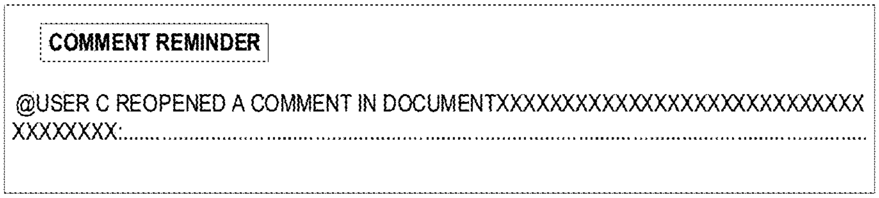

FIG. 15

THIS COMMENT HAS BEEN DELETED
3 HOURS AGO

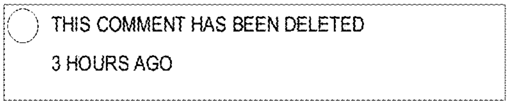

FIG. 16a

METHOD AND ELECTRONIC DEVICE FOR MESSAGE NOTIFICATION BASED ON CLIENT ACTIVE STATUS

CROSS REFERENCE

The present application is a national stage application filed under 37 U.S.C. 371 based on International Patent Application No. PCT/CN2022/116107, filed on Aug. 31, 2022, which claims priority to Chinese Patent Application No. 202111016286.9, filed on Aug. 31, 2021 and entitled "METHOD, APPARATUS, DEVICE, AND STORAGE MEDIUM FOR MESSAGE NOTIFICATION" and Chinese Patent Application No. 202210887058.7, filed on Jul. 26, 2022 and entitled "METHOD, APPARATUS, DEVICE, AND STORAGE MEDIUM FOR MESSAGE NOTIFICATION", the contents of which are hereby incorporated by reference in its entirely.

FIELD

This disclosure relates to the field of information technology, and in particular to a method, apparatus, device, and storage medium for message notification.

BACKGROUND

With the continuous development of Internet technologies, user demand for online documents is also increasing. In order to improve user communication experience, message notifications can be displayed on a document page to facilitate user communication.

The message notification logic in a document in relevant technologies is relatively simple, and there is no mature notification technical solution for multi-client participation.

SUMMARY

In order to solve the above technical problems or at least partially solve the above technical problems, embodiments of the present disclosure provide a method, apparatus, device and storage medium for message notification, to enable a currently active client to receive a message from other clients and process rapidly.

The embodiments of the present disclosure provide a method for message notification, the method comprising:

in accordance with a determination that a message is reachable for a plurality of clients of a user, determining a currently active client of the user; and notifying the message in a first notification mode at the currently active client, and notifying the message in a second notification mode at a currently inactive client.

The embodiments of the present disclosure provide a method for message notification, the method comprising:

determining a currently active client of a first user and a currently active client of a second user, the currently active client of the first user sharing a same content page with the currently active client of the second user; and notifying a first message in a first notification mode at the content page of the currently active client of the first user, and notifying a second message in a second notification mode at the content page of the currently active client of the second user.

The embodiment of the present disclosure provides an apparatus for message notification, the apparatus comprising:

a first active client determination module configured to determining a currently active client of a user in accordance with a determination that a message is reachable for a plurality of clients of the user; and a first message notification module configured to notify the message in a first notification mode at the currently active client, and notify the message in a second notification mode at a currently inactive client.

The embodiment of the present disclosure provides an apparatus for message notification, the apparatus comprising:

a second active client determination module configured to determine a currently active client of a first user and a currently active client of a second user, the currently active client of the first user sharing a same content page with the currently active client of the second user; and a second message notification module configured to notify a first message in a first notification mode at the currently active client of the first user, and notify a second message in a second notification mode at the currently active client of the second user.

The embodiment of the present disclosure further provides a device for message notification, the device for message notification comprising:

one or more processors;

a storage device for storing one or more programs, that when executed by the one or more processors, cause the one or more processors to implement the method for message notification as described above.

The present disclosure further provides a computer-readable storage medium having a computer program stored thereon, that when executed by a processor, implements the method for message notification as described above.

The present disclosure further provides a computer program product, the computer program product comprising a computer program or instructions, that when executed by a processor, implements the method for message notification as described above.

The embodiments of the present disclosure discloses a method, apparatus, device and storage medium for message notification, the method comprising: in accordance with a determination that a message is reachable for a plurality of clients of a user, determining a currently active client of the user; and notifying the message in a first notification mode at the currently active client, and notifying the message in a second notification mode at a currently inactive client. The present disclosure enables the currently active client to receive a message from other clients and process rapidly by notifying the message is in a plurality of clients in accordance with a determination that a message is reachable for the plurality of clients of a user, and notifying in different modes at the currently active client and the currently inactive client.

BRIEF DESCRIPTION OF DRAWINGS

In conjunction with the accompanying drawings and with reference to the following detailed description, the above and other features, advantages and aspects of the various embodiments of the present disclosure will become more apparent. Throughout the drawings, like or similar reference numbers denote like or similar elements. It should be understood that the drawings are illustrative and that the components and elements are not necessarily drawn to scale.

FIG. 7*a* is a schematic diagram of a message page that mentions a user in a comment in embodiments of the present disclosure:

FIG. 7*b* is a schematic diagram of a message page that mentions a user in a comment in embodiments of the present disclosure:

FIG. 7*c* is a schematic diagram of a message page that mentions a user in a comment in embodiments of the present disclosure:

FIG. 8*a* is a schematic diagram of a message page for adding comments to document content in embodiments of the present disclosure:

FIG. 8*b* is a schematic diagram of a message page for adding comments to document content in embodiments of the present disclosure:

FIG. 8*c* is a schematic diagram of a message page for adding comments to document content in embodiments of the present disclosure:

FIG. 9*a* is a schematic diagram of a message page in which a comment is replied to in embodiments of the present disclosure:

FIG. 9*b* is a schematic diagram of a message page in which a comment is replied to in embodiments of the present disclosure:

FIG. 9*c* is a schematic diagram of a message page in which a comment is replied to in embodiments of the present disclosure:

FIG. 10*a* is a schematic diagram of a message page in which a comment is responded to in embodiments of the present disclosure:

FIG. 10*b* is a schematic diagram of a message page in which a comment is responded to in embodiments of the present disclosure:

FIG. 11 is a schematic diagram of a message page in which a comment is resolved in embodiments of the present disclosure:

FIG. 12 is a schematic diagram of a message page in which a full text is liked in embodiments of the present disclosure:

FIG. 13*a* is a schematic diagram of a message page in which a full text is commented in embodiments of the present disclosure:

FIG. 13*b* is a schematic diagram of a message page in which a full text is commented in embodiments of the present disclosure:

FIG. 13*c* is a schematic diagram of a message page in which a full text is commented in embodiments of the present disclosure:

FIG. 14 is a schematic diagram of a page in which message content is solved in embodiments of the present disclosure:

FIG. 15 is a schematic diagram of a page displaying an enable message in an instant messaging client in embodiments of the present disclosure:

FIG. 16*a* is a schematic diagram of a page in which message content is deleted in embodiments of the present disclosure:

DETAILED DESCRIPTION

Figure 1:
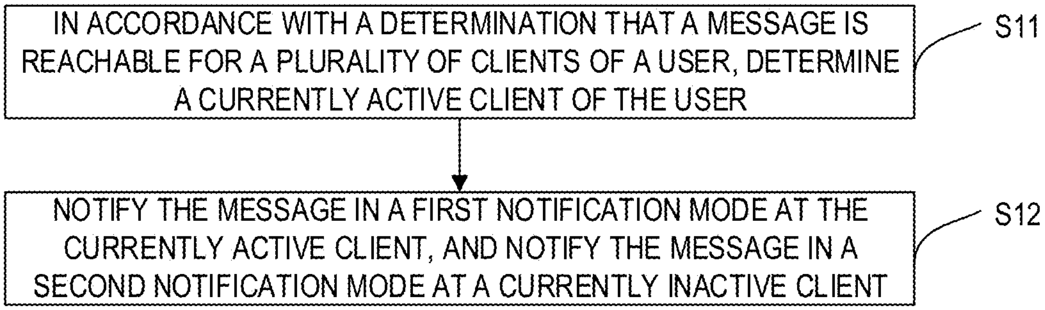
FIG. 1 is a flowchart of a method for message notification in embodiments of the present disclosure.

The following embodiments of the present disclosure will be described in more detail with reference to the accompanying drawings. Although certain embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of the present disclosure.

It should be understood that the various steps described in the method implementation of this disclosure can be executed in different orders and/or in parallel. In addition, the method implementation can include additional steps and/or omit the steps shown. The scope of this disclosure is not limited in this regard.

The term "including" and its variations used in this article are openly inclusive, i.e., "including but not limited to". The term "based on" means "at least partially based on". The term "one embodiment" means "at least one embodiment": the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different apparatuses, modules, or units, and are not used to limit the order or interdependence of the functions performed by these apparatuses, modules, or units.

It should be noted that the modifications of "one" and "a plurality of" mentioned in this disclosure are illustrative and not restrictive. Those skilled in the art should understand that unless otherwise specified in the context, they should be understood as "one or more".

The names of the messages or information exchanged between a plurality of apparatuses in implementations of the present disclosure are for illustrative purposes only and are not intended to limit the scope of these messages or information.

With the continuous development of Internet technologies, user demand for online documents is also increasing. In order to improve user communication experience, message notifications can be displayed on a document page to facilitate user communication.

The existing method for message notification allows users to view new notifications in an instant messaging application and reply in the instant messaging application at the same time. However, a comment is made in a web document. If a user-intensive consumed document receives a large number of comments in a short period of time, switching back and forth between the web document and instant messaging application will increase user consumption cost. Moreover, during a document consumption process, messages from other documents cannot be received on the Web side and processed rapidly.

To address this problem, the embodiments of the present disclosure provide a method for message notification to achieve that web documents can receive other document messages and process rapidly: The method will be described in connection with the following specific embodiments.

Firstly, the nouns that may be involved in this embodiment are briefly introduced. A message refers to a message entity that can be reached and consumed. If Student A leaves a comment in Student B's document, the Student B will receive a message.

A message notification can be understood as an action, that is, a means for reaching the user.

A consumed message refers to a message that has been read or processed by the user and is considered consumed.

An unread message refers to a message that has not been consumed in the current user's message stack.

A number badge indicates the number of unread messages displayed for the user.

A red-dot badge indicates that a message is an unread message.

FIG. 1 is a flowchart of a method for message notification in embodiments of the present disclosure, which are applicable to the case where a message notification is performed in a client. The method may be performed by an apparatus for message notification, which may be implemented in software and/or hardware, and may be configured in an electronic device, such as a terminal, specifically including but not limited to a smart phone, a handheld computer, a tablet, a wearable device with a display screen, a desktop computer, a notebook computer, an all in one, a smart home device. Alternatively, the embodiments of the present disclosure are applicable to the case where the message notification is performed in the service side, and the method may be performed by an apparatus for message notification, which may be implemented in software and/or hardware, and may be configured in an electronic device, such as a server.

As shown in FIG. 1, the method for message notification provided by the embodiments of present disclosure mainly includes the following steps:

S11: in accordance with a determination that a message is reachable for a plurality of clients of a user, determining a currently active client of the user.

In the embodiments of the present disclosure, the plurality of clients of the user can be understood as a plurality of clients or applications that log in simultaneously with one user account. For example, the plurality of client may include a document notification center of a kit Web side, a document notification center of a single Web side, a document notification center of a single mobile side, a document notification center of a mobile kit side, an information feed of an instant messaging application, a bot of an instant messaging information, etc., which are not limited in this embodiment. The currently active client can be understood as the client in which the user's front-end device interface is being displayed currently.

The reaching modes in this implementation mainly include three modes: the first is instant reaching, that is, message content is immediately pushed to a recipient; the second is delayed reaching, that is, the message content is pushed to a recipient after it has stabilized for a period of time; and the third is regular aggregation, that is, a content aggregation within a cycle is pushed to a recipient.

The user' active client may be determined by detecting a current page of the user's front-end device or may be determined by detecting an application process of the user's front-end device, the specific determination mode is not limited by the embodiments.

After determining the user's currently active client, the embodiments further comprise determining whether the currently active client is associated with the message. For example, whether the user is active in the document page that currently generates the message is determined.

Specifically, the front-end determines whether the current user is active in the web document that currently generates the message through a page visibility API. When the user minimizes the window or switches to another tab, the page visibility API sends a visibility change event to enable a listener to know that the page state has changed. Invisible states include page minimization, tab switching and window switching, etc.

S12: notifying the message in a first notification mode at the currently active client, and notifying the message in a second notification mode at a currently inactive client.

The first notification mode and the second notification mode herein may be the same or different, which are not limited in the embodiments of the present disclosure. Optionally, the first notification mode may be a strong reminder notification, for example, a significant state change in an existing interface element in the client interface, or adding a new interface element in the client interface to remind; and the second notification mode may be a weak reminder notification, for example, an insignificant state change in an existing interface element in the client interface.

The first notification mode and the second notification mode can use a sound reminder mode, a vibration reminder mode, or a different mark reminder mode, etc. Furthermore, the first notification mode and the second notification mode use different notification modes. Specifically, the first notification mode and the second notification mode use different marks for notification.

In one implementation, the first notification mode can be a change in the state of unread messages presented in a specific area of the currently active client, such as changes in the brightness, number, color, etc. of a notification icon; and the second notification mode is to present a fixed badge in a specific area of the inactive client, such as using the first fixed badge on the notification center icon for notification.

In the embodiments of the present disclosure, the first notification mode refers to notifying with a number on the notification center icon of the currently active client. The number on the notification center icon may be determined from data of unread messages for the currently active client.

Specifically, in accordance with a determination that the number of unread messages is less than a first threshold, a number badge is updated on the notification center icon, wherein the number on the notification center icon is the number of unread messages; and in accordance with a determination that the number of unread messages is greater than or equal to the first threshold, a second fixed badge is applied on the notification center icon for notification.

It should be noted that the first threshold value may be determined based on an actual situation. Preferably, in the embodiments of the present disclosure, the first threshold value is 999 preferably.

Figure 2A:
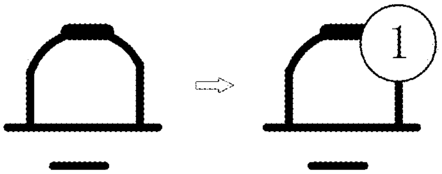
FIG. 2*a* is a schematic diagram of a notification badge in embodiments of the present disclosure.

Specifically, when the number of unread messages of the currently active client is 0, the number badge is added to the notification center icon. As shown in FIG. 2*a*, when the message has not reached the currently active client, no mark is made on the notification center icon. When the message reaches the currently active client, a number mark is added to the notification center icon, and the number is marked as 1.

Furthermore, when the number of unread messages of the currently active client is greater than 0 and less than 999, the number on the notification center icon increases by 1. For example, when the message has not reached the currently active client, the number on the notification center icon is marked as 65, and when the message reaches the currently active client, the number on the notification center icon is increased by 1 to 66.

Figure 2B:
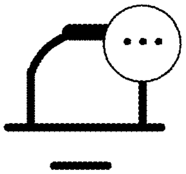
FIG. 2*b* is a schematic diagram of a notification badge in embodiments of the present disclosure.

Further, when the number of unread messages of the currently active client is greater than 999, the number mark on the notification center icon becomes a second fixed badge. In this embodiment, as shown in FIG. 2*b*, when the number of unread messages of the currently active client is greater than 999, three dots " . . . " is applied on the notification center icon for identification.

Figure 2C:
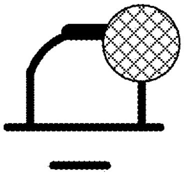
FIG. 2*c* is a schematic diagram of a notification badge in embodiments of the present disclosure.

Further, regardless of the number of messages, a first fixed badge is applied in other inactive clients for notification. The first fixed badge can be selected from different shapes, different colors of a pattern, which is not limited in the embodiments of the present disclosure. For example, as shown in FIG. 2*c*, a circular badge is applied on the notification center icon for notification, with the circular badge filled with red.

Figure 4:
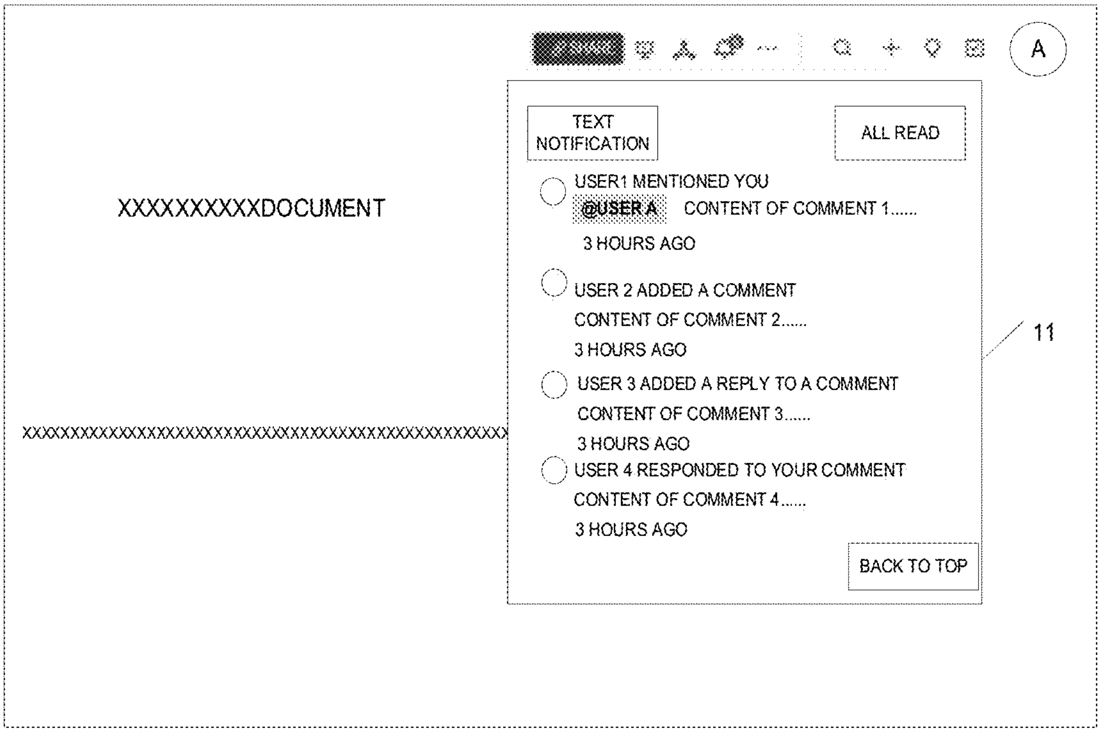
FIG. 4 is a schematic diagram of a document page in embodiments of the present disclosure.

In an applied implementation, the display interface of the currently active client includes a page of the current document. When the notification center of the current document is closed, that is, when a first display area shown in FIG. 4 is not displayed, the first notification mode is used for notification. When the notification center of the current document is opened and if the page of the current document is not pinned, the notification center icon adds the number mark, and the page is not automatically pushed down. The user needs to slide to a home screen to see the unread messages. If the page of the current document is pinned, the notification center icon adds the number annotation, the messages increase from top to bottom, and the top message pushes down the message located below.

Figure 3:
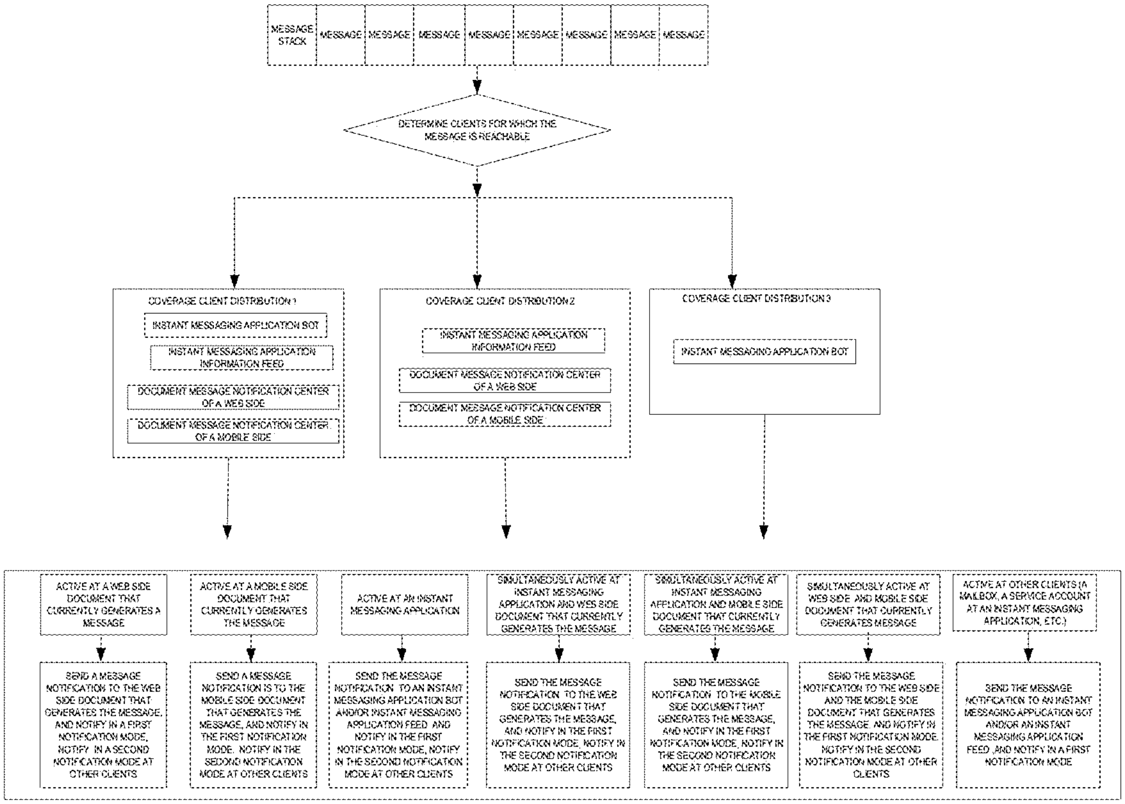
FIG. 3 is a schematic diagram of the structure of a message reaching mechanism in embodiments of present disclosure.

In an applied instance, a schematic diagram of a structure of a message notification mechanism is provided, as shown in FIG. 3. Messages are stored in a message stack, and a client that a message can reach is determined based on the messages in the message stack. The client that the message can reach mainly covers three aspects. The first aspect mainly includes an instant messaging application bot, an instant messaging application information feed, a document message notification center of a Web side, and a document notification center of a mobile side. The second aspect mainly includes an instant messaging application information flow feed, a document message notification center of a Web side, and a document notification center of a mobile side. The second aspect mainly includes an instant messaging application bot.

When a user is active at a Web side document that currently generates a message, a message notification is sent to the Web side document that generates the message and is notified in a first notification mode. The message notification is notified in a second notification mode at other clients.

When the user is active at a mobile side document that currently generates the message, the message notification is sent to the mobile side document that generates the message and is notified in the first notification mode. The message notification is notified in the second notification mode at other clients.

When the user is active at an instant messaging application, the message notification is sent to an instant messaging application bot and/or instant messaging application feed and is notified in the first notification mode. The message notification is notified in the second notification mode at other clients.

When the user is simultaneously active at the instant messaging application and the Web side document that currently generates the message, the message notification is sent to the Web side document that generates the message and is notified in the first notification mode. The message notification is notified in the second notification mode at other clients.

When the user is simultaneously active at the instant messaging application and the mobile side document that currently generates the message, the message notification is sent to the mobile side document that generates the message and is notified in the first notification mode. The message notification is notified in the second notification mode at other clients.

When the user is simultaneously active at the Web side that currently generates the message and the mobile side document that currently generates the message, the message notification is sent to the Web side that generates the message and the mobile side document that generates the message and is notified in the first notification mode. The message notification is notified in the second notification mode at other clients.

When the user is active at other clients (a mailbox, a service account at an instant messaging application, etc.), the message notification is sent to an instant messaging application bot and/or an instant messaging application feed and is notified in a first notification mode.

In one implementation, the method further comprises: for a message of which message content has been displayed, marking the message as read state and canceling an unread mark of the message at all clients.

In the embodiments, after the header and body of the unread message appear in full in a visible area of the current screen, the message is marked as read and the unread mark is cancelled. After the message is marked as read on one channel, it should be automatically marked as read on other channels. In this way, the cost of user message consumption can be reduced.

In one embodiment, the display interface of the currently active client includes the page of the current document; the method further comprises:

in response to a first operation on the page of the current document, displaying the message in a first display area of the page of the current document, the message being associated with the current document and/or a document other than the current document Among them, the above document can be any of the following types: a document, a table, a knowledge base, a mind note, etc.

In the embodiments of the present disclosure, the first operation on the page of the current document may be understood as a user operation on the notification center icon of the page of the current document. The above operation may include anyone or more of click, double-click, touch, etc., which is not limited in the embodiments of the present disclosure.

Among them, the above message being associated with the current document includes one or more of: the message is a comment on the current document; the message is a reply to an existing comment on the current document; the message mentions relevant information about the current document; the message is a response of other clients to document comments, etc., where the relevant information about the current document includes the author of the current document, a certain statement in the current document, etc.

As shown in FIG. 4, a plurality of messages is displayed in a first display area 11 of the page of the current document in response to a clicking operation on the notification center icon in the page of the current document. Further, in response to an operation on the "text notification" button in FIG. 4, only messages associated with the current document are displayed in the first display area 11.

Furthermore, in response to an operation on an "all read" button in FIG. 4, all messages are marked as read state, and the number mark on the notification center icon is returned to 0. When the user is sliding the notification center currently, a "back to top" button herein appears in the lower right corner. In response to an operation on the "back to top" button, the top of the notification center is immediately slid to. In addition, during a period when a page window of the current document is not reloaded and when the user enters the page of the notification center, the first display area is displayed that records a document position of the user's last browsing and navigates to the document position of the last browsing.

In one embodiment, a display interface of the currently active client comprises a page of a current document, and in accordance with a determination that the current document is in a first operating mode, and in response to a first operation on the message, message content is displayed in a second display area and a location associated with the message content is navigated to.

In one possible implementation, the first operating mode refers to an editing mode, and document types applicable to the editing mode mainly include a document, a table, a knowledge base, and a mind note. The first operation on the message can be understood as an operation on the message shown in FIG. 4, which can be any other operating modes such as clicking, double-clicking, etc.

In one possible implementation, the first operating mode refers to a translation mode, and document types applicable to the translation mode mainly include a document and a table. The first operation on the message can be understood as an operation on the message shown in FIG. 4, which can be any other operation mode such as clicking, double-clicking, etc.

Figure 5:
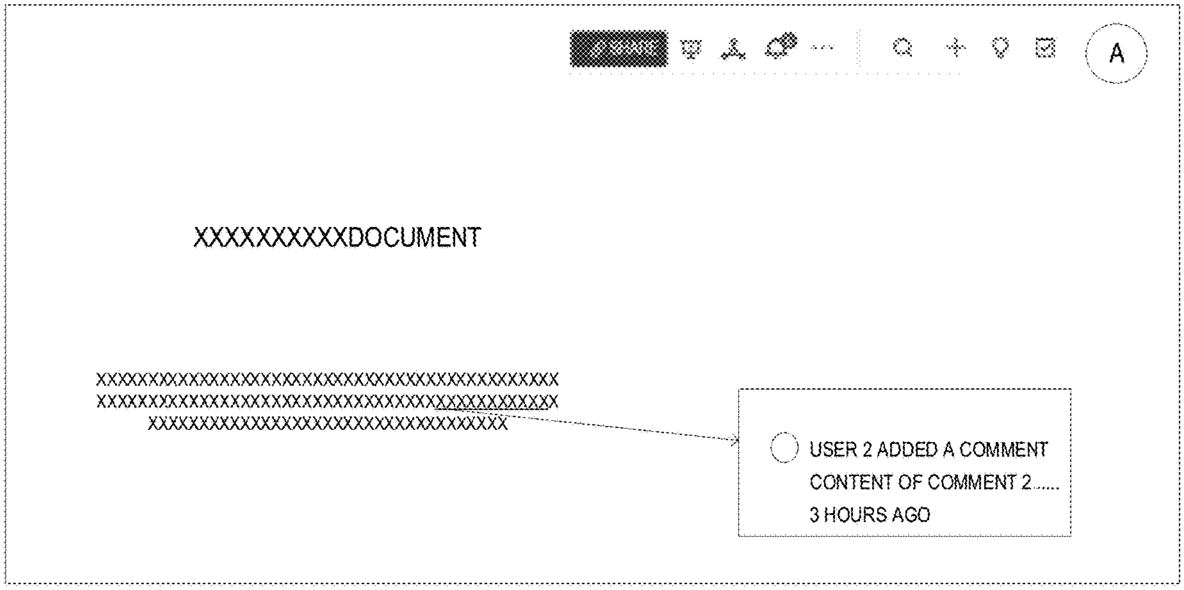
FIG. 5 is a schematic diagram of a document page in embodiments of the present disclosure.

As shown in FIG. 5, message content is displayed in a second display area, and a location associated with the message content is directly navigated to. In addition, the content associated with the message can be emphasized, and in this embodiment, it is emphasized with an underline. Other methods can also be used for display, such as bold font, adding shading, changing font color, etc., which is not limited in this embodiment.

In one embodiment, a display interface of the currently active client comprises a page of the current document, and in accordance with a determination that the current document is in a second operating mode, and in response to a second operation on the message, the current document is switched to a first operating mode, message content is displayed in a second display area, and a location associated with the message content is navigated to.

In one possible implementation, the second operating mode refers to a history mode, and document types applicable to the history mode mainly include a document, a table, a knowledge base, and a mind note. The second operation on the message can be understood as an operation on the message shown in FIG. 4, which can be any other operating mode such as clicking, double-clicking, etc.

In one possible implementation, the second operating mode refers to a viewing board mode, and document types applicable to the viewing board mode mainly include a document, a table, a knowledge base, and a mind note. The second operation on the message can be understood as an operation on the message shown in FIG. 4, which can be any other operating mode such as clicking, double-clicking, etc.

In response to the second operation on the message, the page of the current document is switched from the history operating mode to the editing mode. And the message content is displayed in the second display area, the message content is displayed in the second display area, and the page is directly navigated to the location associated with the message content.

In one embodiment, a display interface of the currently active client comprises a page of a current document, and in accordance with a determination that a floating layer is present on the page of the current document, and in response to a third operation on the message, the floating layer is closed and a location associated with message content is navigated to.

Although a floating layer is present on the page of the current document, users can also operate on the notification center, and document types applicable to the above operating mode mainly includes a document, a table, a knowledge base, and a mind note. The third operation on the message can be understood as an operation on the message shown in FIG. 4, which can be any other operating mode such as clicking, double-clicking, etc.

In response to the third operation on the message, the above floating layer is closed and the document location associated with the message content is navigated to.

In one possible implementation, when the current document has not been loaded yet or is waiting for being navigated and the user clicks on other function button, a tab or a jump, etc., an interaction layer always responds to the result of the last click and is based on the last event listened to.

In one possible implementation, after the user clicks on the same notification message a plurality of times and the navigation is completed, the user continues to click on the same message a plurality of times. The interaction layer does not respond to a plurality of triggers, and the current page does not change. For a further trigger after 300 ms, the interaction layer can respond to the user operation.

In one possible implementation, when the user clicks on the message and in response to the response times out, the interaction layer only pops up a prompt box, prompting "the request timed out".

In one embodiment, an interaction and style of the message will be briefly described and introduced.

Figure 6A:
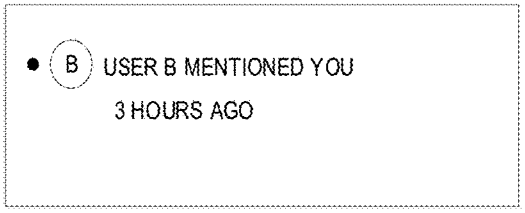
FIG. 6*a* is a schematic diagram of a message page directly mentioning a user in embodiments of the present disclosure.
Figure 6B:
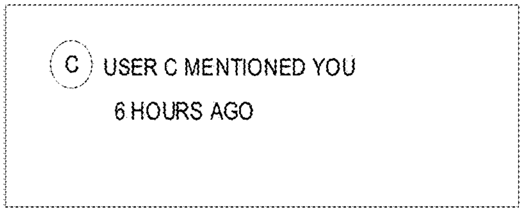
FIG. 6*b* is a schematic diagram of a message page directly mentioning a user in embodiments of the present disclosure.
Figure 6C:
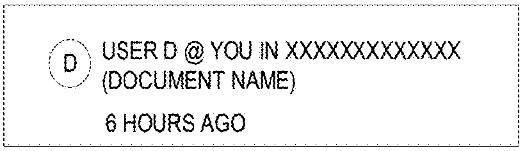
FIG. 6*c* is a schematic diagram of a message page directly mentioning a user in embodiments of the present disclosure.

When the current user is mentioned in content of a document, a table, and a mind note, a display layer of a notification center of a kit Web side is shown in FIG. 6*a*. The first line displays “mentioned you” after a user image, and the front of the user image is marked with a circular badge. The second line displays “3 hours ago” which is the time when the message was sent. The display layer of a notification center of a kit mobile side is shown in FIG. 6*b*. The first line displays “mentioned you” after the user image, and the second line displays “3 hours ago” which is the time when the message was sent. In the interaction layer, a personal information floating layer is opened by clicking on the user profile photo; and the mentioned location is navigated to and is highlighted by clicking on a message block. A notification page at a single product Web side and single product mobile side is shown in FIG. 6*c*. The notification information mainly includes that the message sender mentions you in XXXX (document name), wherein XXXX is a document link, which can open a document page once clicked.

A display mode when the user is mentioned in a cell of a table is consistent with the display modes of the notification centers of the kit Web side and mobile side when the user is in the document or the mind note, which can refer to the above description and will not be repeated in this embodiment.

When mentioned in a document, a table, and a mind note, a display layer of a notification center of a kit mobile side is shown in FIG. 7*a*. The first line displays “added a comment” after a user image, and the front of the user image is marked with a circular mark. The middle content is the specific content of the comment, and the last line displays “3 hours ago” which is the time when the message was sent. A display layer of a notification center of a kit mobile side is shown in FIG. 7*b*. The first line displays “added a comment” after a user image; the middle content is the specific content of the comment; and the last line displays “3 hours ago” which is the time when the message was sent. In an interaction layer of the notification center of the kit Web side and an interaction layer of the notification center of the kit mobile side, a personal information floating layer is opened by clicking on the user profile photo; a comment panel is opened, and the mentioned comment location is navigated to and is highlighted by clicking on a message block. A notification page at a single product Web side and single product mobile side is shown in FIG. 7*c*. The notification information mainly includes the message sender adding a comment in XXXX (document name), content of the comment, and the user being mentioned(@) in the comment, wherein XXXX is a document link, which can open a document page once clicked.

When the user is mentioned in a reply to a comment of a document, a mind note, and a table, the display page is basically similar to the above display page that the user is mentioned in a comment, except that in this embodiment, it is “added a reply to a comment” after the user image. Other contents are the same, please refer to the above description for details.

For all document types, when the content created or edited is commented on, a display layer of a notification center of a kit Web side is shown in FIG. 8*a*. The first line displays “added a comment” after a user image, and the front of the user image is marked with a circular mark. The middle content is the specific content of the comment, and the last line displays “3 hours ago” which is the time when the message was sent. A display layer of a notification center of a kit mobile side is shown in FIG. 8*b*. The first line displays “added a comment” after a user image. The middle content is the specific content of the comment, and the last line displays “3 hours ago” which is the time when the message was sent. In an interaction layer of the notification center of the kit Web side and an interaction layer of the notification center of the kit mobile side, a personal information floating layer is opened by clicking on the user profile photo; a comment panel is opened, the commented location is navigated to and is highlighted, and the comment is selected by clicking on a message block. A notification page at a single product Web side and single product mobile side is shown in FIG. 8*c*. The notification information mainly includes the message sender adding a comment in XXXX (document name), content of the comment, wherein XXXX is a document link, which can open a document page once clicked.

In the current document, there is a new reply to a comment left by others, for example, Student A replies to a comment left by Student B in the current document, or a comment issued by the current user is replied to. A display layer of a notification center on a kit Web side is shown in FIG. 9*a*. The first line displays “added a reply to a comment” after a user image, and the front of the user image is marked with a circular logo. The middle content is the specific content of the comment. The last line displays “3 hours ago” which is the time when the message was sent. The display layer of the notification center of the kit mobile side is shown in FIG. 9*b*. The first line displays “added a reply to a comment” after a user image. The middle content is the specific content of the comment. The last line displays “3 hours ago” which is the time when the message was sent. In an interaction layer of the notification center of the kit Web side and an interaction layer of the notification center of the kit mobile side, a personal information floating layer is opened by clicking on a user profile photo; a comment panel is opened, and the mentioned comment location is navigated to and is highlighted by clicking on a message block. A notification page at a single product Web side and single product mobile side is shown in FIG. 9*c*. The notification information mainly includes the message sender adding a reply to a comment in XXXX (document name) and content of the comment, wherein XXXX is a document link, which can open a document page once clicked.

When a comment is responded to, a display layer of a notification center of a kit Web side is shown in FIG. 10*a*. The first line displays “responded to your comment” after the user image, and the front of the user image is marked with a circular mark. The middle content is the specific content of the response comment, and the last line is “3 hours ago”, which is the time the message was sent. A notification page at a single product Web side and single product mobile side is shown in FIG. 10*b*. The notification information mainly includes that the message sender responding to your comment in XXXX (document name) and content of the comment, wherein XXXX is a document link, which can open a document page once clicked.

When a comment is resolved, a notification page on the single product Web side and the single product mobile side is shown in FIG. 11. The notification information mainly includes the content of the comment being resolved by the message sender in XXXX (document name), wherein XXXX is a document link, which can open a document page once clicked.

When a full text is liked, a notification page on the single product Web side and the single product mobile side is shown in FIG. 12. The notification information mainly includes that User B and user C liked XXXX (document name) yesterday, profile photos of User B and user C being displayed below, wherein XXXX is a document link, which can open a document page once clicked.

When a full text is commented on, a display layer of a notification center of a kit Web side is shown in FIG. 13*a*. The first line displays "added a full text comment" after a user image, and the front of the user image is marked with a circular mark. The middle content is the specific content of the comment, and the last line displays "3 hours ago" which is the time when the message was sent. A display layer of a notification center of a kit mobile side is shown in FIG. 13*b*. The first line displays "added a full text comment" after a user image. The middle content is the specific content of the comment, and the last line displays "6 hours ago" which is the time when the message was sent. In an interaction layer of the notification center of the kit Web side and an interaction layer of the notification center of the kit mobile side, a personal information floating layer is opened by clicking on a user profile photo; and a location corresponding to the full text comment is jumped to by clicking on a message block. A notification page at a single product Web side and single product mobile side is shown in FIG. 13*c*. The notification information mainly includes the message sender adding a full text comment in XXXX (document name) and content of the comment, wherein XXXX is a document link, which can open a document page once clicked.

In one possible implementation, a display interface of the currently active client comprises a page of a current document; and in accordance with a determination that content corresponding to the message is resolved, and in response to a fourth operation on the message, prompt content is displayed in a third display area of the page of the current document, the prompt content being used to indicate that the content corresponding to the message has been resolved.

The resolution of the content corresponding to the message can be understood as deletion, hiding of the content corresponding to the message or other set invisible states. The fourth operation on the message can be understood as the operation on the message shown in FIG. 4, which can be any other operating mode such as clicking, double-clicking, etc.

As shown in FIG. 14, a third comment has been resolved. When the user clicks on the third comment, the prompt content "! this comment has been resolved" is displayed in a third display area 13 of the page of the current document, indicating that the content corresponding to the message has been resolved. In addition, the current user clicks on the profile photo of User 3, a user information floating layer card can be displayed.

In one possible implementation, a display interface of the currently active client comprises a page of a current document; and in accordance with a determination that content corresponding to the message is re-enabled, the content corresponding to the message is displayed in the page of the current document, and in response to a fifth operation on the content corresponding to the message, content input by the user is received.

The re-enablement of the content corresponding to the message can be understood as the re-enablement of the content corresponding to the message after being resolved, for example, it can be a resumption of the content corresponding to the message after being deleted; or it can also be a re-display of the content corresponding to the message after being hidden, etc.

After the content corresponding to the message is re-enabled, the message content can be displayed in the page of the current document and the content input by the user can be received. The above content input by the user includes a reply, a response, a liking, etc. to the message content.

In one possible implementation, content corresponding to the message is content at a document client of the user; and in accordance with a determination that the content corresponding to the message is re-enabled, an enabling message is displayed at an instant messaging client of the user, the enabling message comprising a document link.

The interface of the user's instant messaging client that displays the enabling message is shown in FIG. 15, which is used to remind that User C has reopened a comment in the document XXX (document name) and the specific content of the comment.

Figure 16B:
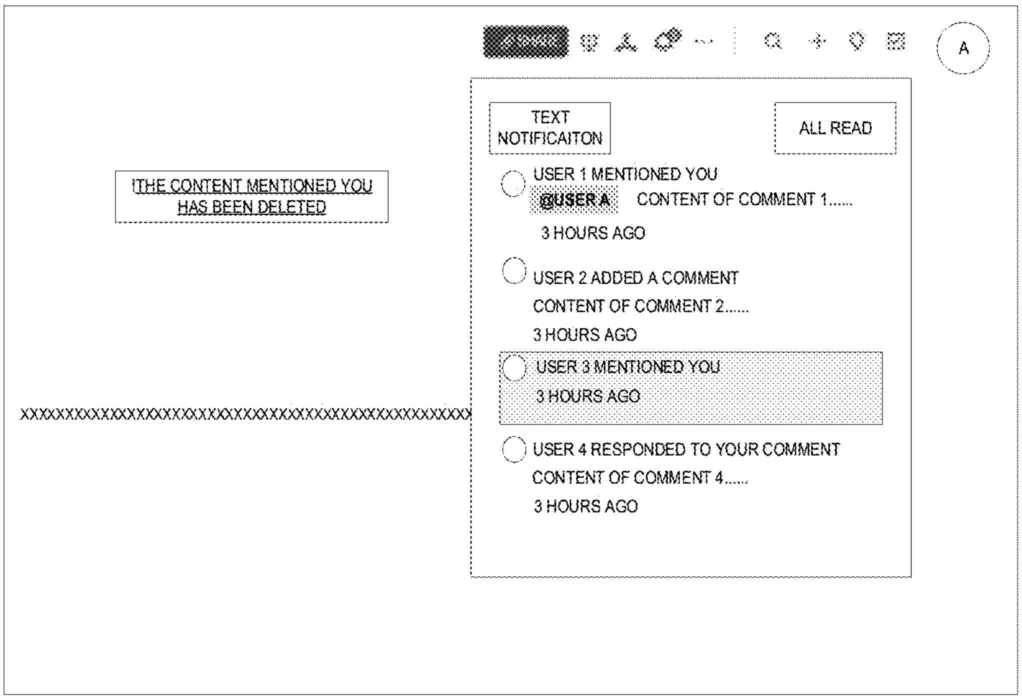
FIG. 16*b* is a schematic diagram of a page in which message content is deleted in embodiments of the present disclosure.

In one possible implementation, when a comment is deleted or a reply to a comment is deleted, the message corresponding to the display layer is displayed as shown in FIG. 16*a*. It is prompted behind a user image that this comment has been deleted. In response to the user's click operation on the message, only a prompt box pops up that indicates "the content mentioning you has been deleted" (as shown in FIG. 16*b*), and the page does not jump. In response to the user's click operation on the user' profile photo, a user information floating layer card can be displayed.

It should be noted that the above comment and the reply to the comment are both a type of content corresponding to the message.

In one possible implementation, when original text of the commented document is deleted, the message display and content corresponding to the display layer remain unchanged, as shown in FIG. 16*a*. At the interaction level, in response to the user's click operation on the message, a prompt box pops up that indicates "original text corresponding to the comment has been deleted", and the page does not jump; and in response to the user's click operation on the user's profile photo, the user information floating layer card can be displayed.

In one possible implementation, if a message mentioning you is deleted in the document, the message display and content corresponding to the display layer remain unchanged, that is, the original style is retained. At the interaction level, in response to the user's click operation on the message, only a prompt box pops up that indicates "the content mentioning you has been deleted" (as shown in FIG. 16*b*), and the page will not jump; and in response to the user's click operation on the user's profile photo, the user information floating layer card can be displayed.

In one possible implementation, when a response to a comment is deleted, the message display and content corresponding to the display layer remain unchanged and the original style is retained. At the interaction level, in response to the user's click operation on the message, only a prompt box pops up that indicates "this response has been deleted" and the page does not jump; and in response to the user's click operation on the user's profile photo, the user information floating layer card can be displayed.

In one possible implementation, in accordance with a determination that the message comprises a document link, a document page corresponding to the document link is jumped to in response to a fourth operation on the message.

In one possible implementation, in accordance with a determination that the message comprises a document link and a linked document belongs to a document space, a page of the document space is jumped to in response to a fifth operation on the message.

In this embodiment, when the above message is associated with other documents, the message carries a document link of the associated document. In response to a click operation on the document link in the message, a document page corresponding to the document link is jumped to.

Further, when the linked document belongs to the document space, the page of the document space is jumped to in response to a click operation on the document link in the message.

In a real-time mode, a knowledge base can perform interactions on a corresponding knowledge base page in a knowledge base notification center logic. A default document, a table and a mind note address is jumped to in an instant messaging application Bot and an instant messaging application Feed.

In a real-time mode, a knowledge base can perform interactions on a corresponding knowledge base page in a knowledge base notification center logic. In an instant messaging application Bot and an instant messaging application Feed, if a document is a document of the knowledge base, a support base page should be jumped to by default, rather than a document page.

Figure 17:
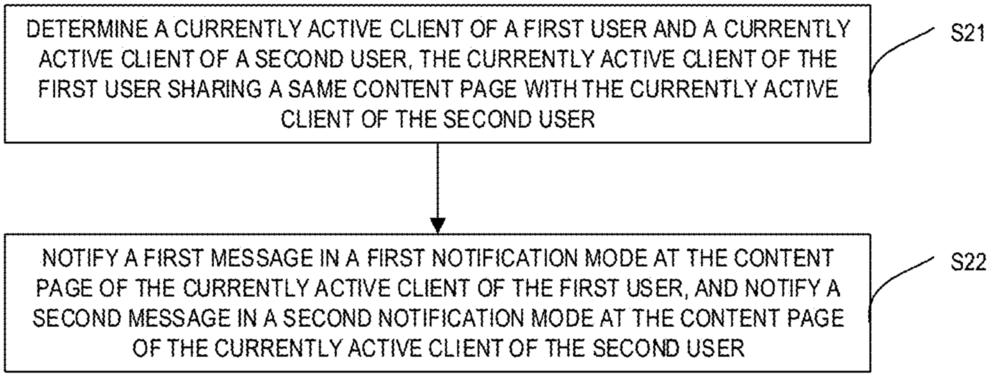
FIG. 17 is a flowchart of a further method for message notification in embodiments of the present disclosure.

FIG. 17 is a flowchart of a further method for message notification in embodiments of the present disclosure. As shown in FIG. 17, the method for message notification provided in the embodiments specifically includes the following steps:

S21: determining a currently active client of a first user and a currently active client of a second user, the currently active client of the first user sharing a same content page with the currently active client of the second user.

The first user and the second user herein can be understood as accounts participating in a same video conference. The currently active client of the first user shares the same content page with the currently active client of the second user, which can be the first user sharing a page of his/her currently active client with the currently active client of the second user, or the second user sharing a page of his/her currently active client with the currently active client of the first user.

Further, the method for determining the currently active client of the first user and the currently active client of the second user is the same as that for determining the currently active client of the user provided in the above embodiments. The details can refer to the expression in the above embodiments, which is not limited in this embodiment.

S22: notifying a first message in a first notification mode at the content page of the currently active client of the first user, and notifying a second message in a second notification mode at the content page of the currently active client of the second user.

In one embodiment, the first message and the second message are both triggered based on user interaction with the content of the content page. The interaction behavior between a certain user and the first user in the content of the content page will generate a first message and be notified on the content page displayed by the client of the first user; the interaction behavior between a certain user and the second user in the content of the content page will generate a second message and be notified on the content page displayed by the client of the second user. The client of the first user displays the same content page synchronously with the client of the second user, but the notification message in the content page is displayed asynchronously in the first user client and the second user client, each client displaying the notification message corresponding to the respective one of the users. On one hand, this can avoid disturbing other users, and on the other hand, it can reduce the signal to noise ratio and improve the efficiency of message reading.

The first notification mode and the second notification mode may be the same or different, which is not limited in this embodiment.

In one embodiment, the first message is determined based on the content page and an identity of the first user, and the second message is determined based on the content page and an identity of the second user.

The first message herein is a message sent by other users to the first user, and the second message is a message sent by other users to the second user. Specifically, what displayed by each user's notification center are the respective user's notification and a notification badge. That is to say, the client of the first user displays the first user's own notification and notification badge, and the client of the second user displays the second user's own notification and notification badge. Optionally, the first user can be a host of a video conference, and the second user can be a participant in the same video conference.

In one embodiment, the method further comprises notifying the first message in a third notification mode at a currently inactive client of the first user.

In the embodiments of the present disclosure, the specific method for notifying the first message in a third notification mode at a currently inactive client of the first user is the same as that for sending the message to the currently inactive client for notification provided in the above embodiments. The details can refer to the expression in the above embodiments, which is not limited in this embodiment.

In one embodiment, in response to a sharing operation on the content page, a notification display area of the message is created in a shared interface, the notification display area displaying, for a user engaging in sharing, a notification message associated with the user.

Specifically, the numbers of messages and a message panel are not synchronized because they display messages of respective one of the users.

Furthermore, after the first user clicks on the message, expansion and navigating operations of a comment panel need to be synchronized. And this navigating operation needs to be synchronized. After the second user clicks on the message, it immediately enters a free preview mode, that is, it is free to browse and share the page.

Figure 18:
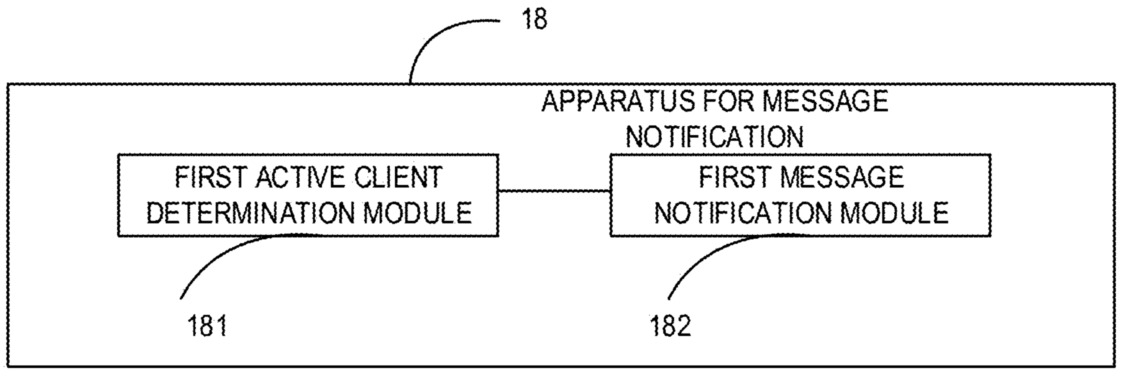
FIG. 18 is a schematic diagram of a structure of an apparatus for message notification in embodiments of the present disclosure.

FIG. 18 is a schematic diagram of a structure of an apparatus for message notification in embodiments of the present disclosure. The message notification provided by the embodiments of present disclosure may be configured in a client or may be configured in a service side, and the apparatus 180 for message notification specifically comprises a first active client determination module 181 and a first message notification module 182.

The first active client determination module 181 herein is configured to determine a currently active client of a user in accordance with a determination that a message is reachable for a plurality of clients of the user; and the first message notification module 182 is configured to notify the message in a first notification mode at the currently active client, and notify the message in a second notification mode at a currently inactive client.

The embodiments of the present disclosure disclose an apparatus for message notification, which performs the following steps: in accordance with a determination that a message is reachable for a plurality of clients of a user, determining a currently active client of the user; and notifying the message in a first notification mode at the currently active client, and notifying the message in a second notification mode at a currently inactive client. The present disclosure enables the currently active client to receive a message from other clients and process rapidly by notifying the message is in a plurality of clients in accordance with a determination that a message is reachable for the plurality of clients of a user, and notifying in different modes at the currently active client and the currently inactive client.

In one embodiment, the first notification mode is determined based on the number of unread messages of the currently active client; and the second notification mode uses a first fixed badge on a notification center icon for notification.

In one embodiment, determining the first notification mode based on the number of unread messages of the currently active client comprises: in accordance with a determination that the number of unread messages is less than a first threshold, updating a number badge on the notification center icon, wherein the number on the notification center icon is the number of unread messages; and in accordance with a determination that the number of unread messages is greater than or equal to the first threshold, applying a second fixed badge on the notification center icon for notification.

In one embodiment, a display interface of the currently active client comprises a page of a current document, and in accordance with a determination that the current document is in a first operating mode, and in response to a first operation on the message, message content is displayed in a second display area and a location associated with the message content is navigated to.

In one embodiment, a display interface of the currently active client comprises a page of the current document, and in accordance with a determination that the current document is in a second operating mode, and in response to a second operation on the message, the current document is switched to a first operating mode, message content is displayed in a second display area, and a location associated with the message content is navigated to.

In one embodiment, a display interface of the currently active client comprises a page of a current document, and in accordance with a determination that a floating layer is present on the page of the current document, and in response to a third operation on the message, the floating layer is closed and a location associated with message content is navigated to.

In one embodiment, a display interface of the currently active client comprises a page of a current document; and in accordance with a determination that content corresponding to the message is resolved, and in response to a fourth operation on the message, prompt content is displayed in a third display area of the page of the current document, the prompt content being used to indicate that the content corresponding to the message has been resolved.

In one embodiment, a display interface of the currently active client comprises a page of a current document; and in accordance with a determination that content corresponding to the message is re-enabled, the content corresponding to the message is displayed in the page of the current document, and in response to a fifth operation on the content corresponding to the message, content input by the user is received.

In one embodiment, content corresponding to the message is content at a document client of the user; and in accordance with a determination that the content corresponding to the message is re-enabled, an enabling message is displayed at an instant messaging client of the user, the enabling message comprising a document link.

In one embodiment, in accordance with a determination that the message comprises a document link, a document page corresponding to the document link is jumped to in response to a fourth operation on the message.

In one embodiment, in accordance with a determination that the message comprises a document link and a linked document belongs to a document space, a page of the document space is jumped to in response to a fifth operation on the message.

In one embodiment, the apparatus further comprises: for a message of which message content has been displayed at any client, marking the message as read and canceling an unread mark of the message at all clients.

The apparatus for message notification provided in the embodiments of the present disclosure may perform the steps of the method for message notification provided in the embodiments of the present disclosure. The specific performed steps and beneficial effects are not repeated herein.

Figure 19:
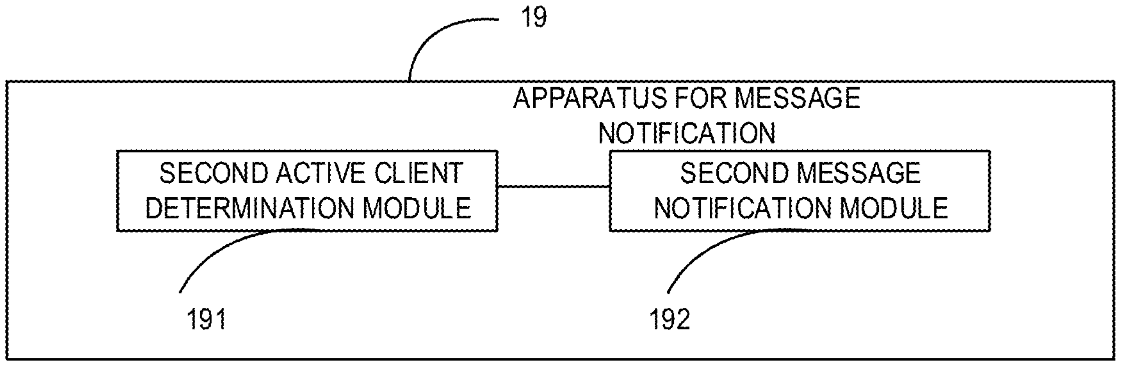
FIG. 19 is a schematic diagram of a structure of a further apparatus for message notification in embodiments of the present disclosure.

FIG. 19 is a schematic diagram of a structure of a further apparatus for message notification in embodiments of the present disclosure. The message notification provided in embodiments of the present disclosure may be configured in a client or may be configured in a service side. The apparatus 190 for message notification specifically comprises a second active client determination module 191 and a second message notification module 192.

The second active client determination module 191 herein is configured to determine a currently active client of a first user and a currently active client of a second user, the currently active client of the first user sharing a same content page with the currently active client of the second user; and the second message notification module 192 is configured to notify a first message in a first notification mode at the content page of the currently active client of the first user, and notify a second message in a second notification mode at the content page of the currently active client of the second user.

In one embodiment, the first message is determined based on the content page and an identity of the first user, and the second message is determined based on the content page and an identity of the second user.

In one embodiment, further comprises: notifying the first message in a third notification mode at a currently inactive client of the first user.

In one embodiment, further comprises: in response to a sharing operation on the content page, creating a notification display area of the message in a shared interface, the notification display area displaying, for a user engaging in sharing, a notification message associated with the user.

The apparatus for message notification provided in the embodiments of the present disclosure may perform the steps of the method for message notification provided in the embodiments of the present disclosure. The specific performed steps and beneficial effects are not repeated herein.

Figure 20:
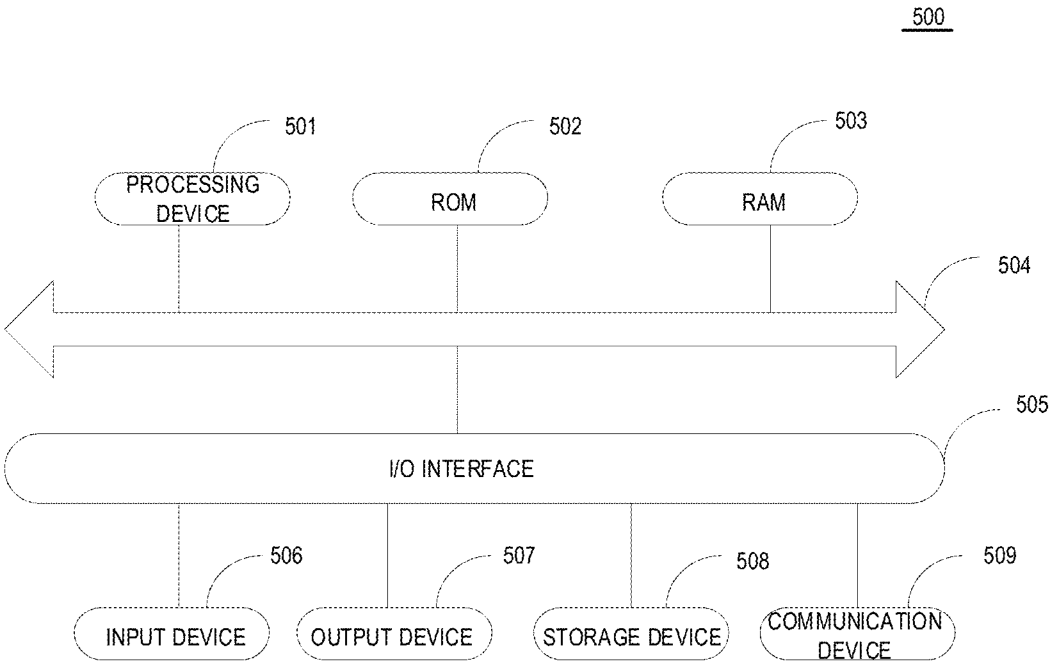
FIG. 20 is a schematic diagram of a structure of an electronic device in embodiments of the present disclosure.

FIG. 20 is a schematic diagram of the structure of a device for message notification in embodiments of the present disclosure. Referring specifically to FIG. 20 below, it shows a schematic diagram of the structure suitable for implementing the electronic device 500 in the embodiments of the present disclosure. The electronic device 500 in the embodiments of the present disclosure may include but is not limited to mobile terminals such as mobile phones, laptops, digital broadcast receivers, PDAs (personal digital assistants), PAD (tablet computers), PMPs (portable multimedia players), car-mounted terminals (such as car navigation terminals), wearable electronic devices, and fixed terminals such as digital TVs, desktop computers, smart home devices, etc. The electronic device shown in FIG. 20 is only an example and should not bring any limitations on the functionality and scope of use of the embodiments of the present disclosure.

As shown in FIG. 20, the electronic device 500 may include a processing device (such as a central processor, graphics processing unit, etc.) 501, which can perform various appropriate actions and processes according to the program stored in the read-only memory (ROM) 502 or loaded from the storage device 508 into the random access memory (RAM) 503 to implement the method of the embodiment described in this disclosure. In the RAM 503, various programs and data required for the operation of the electronic device 500 are also stored. The processing device 501, the ROM 502, and the RAM 503 are connected to each other through a bus 504. The input/output (I/O) interface 505 is also connected to the bus 504.

Typically, the following devices can be connected to the I/O interface 505: input devices 506, including touch screens, touchpads, keyboards, mice, cameras, microphones, accelerometers, gyroscopes, etc.; output devices 507, including liquid crystal displays (LCDs), speakers, vibrators, etc.; storage devices 508, including magnetic tapes, hard disks, etc.; and communication devices 509. Communication devices 509 can allow electronic devices 500 to communicate wirelessly or wirelessly with other devices to exchange data. Although FIG. 20 shows an electronic device 500 with various devices, it should be understood that it is not required to implement or have all of the devices shown. More or fewer devices can be implemented or provided alternatively.

In particular, according to embodiments of the present disclosure, the process described above with reference to the flowchart may be implemented as a computer software program. For example, embodiments of the present disclosure include a computer program product comprising a computer program carried on a non-transitory computer-readable medium, the computer program comprising program code for performing the method shown in the flowchart, thereby implementing the method for message notification as described above. In such embodiments, the computer program may be downloaded and installed from the network through the communication device 509, or is installed from the storage device 508, or is installed from the ROM 502. When the computer program is executed by the processing device 501, the above-described functions defined in the method of the present disclosure are performed.

It should be noted that the computer-readable medium described above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device, or any combination thereof. More specific examples of computer-readable storage media can include but are not limited to an electrical connection with one or more wires, a portable computer disk, a hard disk, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof. In this disclosure, a computer-readable storage medium can be any tangible medium containing or storing a program that can be used by or in conjunction with an instruction execution system, device, or device. In this disclosure, a computer-readable signal medium can include a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to wires, optical cables, RF (radio frequency), etc., or any suitable combination thereof.

In some embodiments, the client and server may communicate using any currently known or future developed network protocol such as HTTP (Hypertext Transfer Protocol) and may be interconnected with any form or medium of digital data communication (e.g., a communication network). Examples of communication networks include local area networks ("LANs"), wide area networks ("WANs"), the Internet (e.g., the Internet), and end-to-end networks (e.g., ad hoc end-to-end networks), as well as any currently known or future developed networks.

The computer-readable medium can be included in the electronic device, or it can exist alone and not assembled into the electronic device.

The computer-readable medium carries one or more programs, and when the one or more programs are executed by the electronic device, the electronic device: determines the currently active client of the user when the message can reach a plurality of clients of the user; notifies the currently active client in the first notification mode, and notifies the non-currently active client in the second notification mode.

Alternatively, the computer-readable medium carries one or more programs, and when the one or more programs are executed by the electronic device, the electronic device: determines the currently active client of the first user and the currently active client of the second user, and the currently active client of the first user shares the same content page with the currently active client of the second user; notifies the first message in the first notification mode on the content page of the currently active client of the first user, and notifies the second message in the second notification mode on the content page of the currently active client of the second user.

Alternatively, when the one or more programs are executed by the electronic device, the electronic device may also perform other steps described above embodiments.

Computer program code for performing the operations of the present disclosure may be written in one or more programming languages, or combinations thereof, including but not limited to Object Oriented programming languages such as Java, Smalltalk, C++, and also including conventional procedural programming languages such as "C" language or similar programming languages. The program code may be executed entirely on the user's computer, partially on the user's computer, as a standalone software package, partially on the user's computer, or entirely on a remote computer or server. In the case of a remote computer, the remote computer may be connected to the user's computer through any type of network, including a local area network (LAN) or a wide area network (WAN), or may be connected to an external computer (e.g., using an Internet service provider to connect via the Internet).

The flowcharts and block diagrams in the accompanying drawings illustrate the architecture, functions, and operations of systems, methods, and computer program products that may be implemented in accordance with various embodiments of the present disclosure. in this regard, each block in the flowchart or block diagram may represent a module, program segment, or portion of code that contains one or more executable instructions for implementing a specified logical function. It should also be noted that in some alternative implementations, the functions marked in the blocks may also occur in a different order than those marked in the figures. For example, two blocks represented in succession may actually be executed substantially in parallel, and they may sometimes be executed in reverse order, depending on the function involved. It should also be noted that each block in the block diagram and/or flowchart, and combinations of blocks in the block diagram and/or flowchart, may be implemented using a dedicated hardware-based system that performs the specified function or operation, or may be implemented using a combination of dedicated hardware and computer instructions.

Described in the embodiments of the present disclosure relates to the disclosed unit may be implemented by way of software, may be implemented by way of hardware, wherein the name of the unit does not constitute a limitation on the unit itself in some cases.

The functions described above herein may be performed at least in part by one or more hardware logic components. For example, without limitation, example types of hardware logic components that may be used include field programmable gate arrays (FPGAs), application specific integrated circuits (ASICs), application specific standard products (ASSPs), system-on-chip (SOCs), complex programmable logic devices (CPLDs), and the like.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, the present disclosure provides a method for message notification, comprising: in accordance with a determination that a message is reachable for a plurality of clients of a user, determining a currently active client of the user; and notifying the message in a first notification mode at the currently active client, and notifying the message in a second notification mode at a currently inactive client.

According to one or more embodiments of the present disclosure, in the method for message notification provided in the present disclosure, the first notification mode is determined based on the number of unread messages of the currently active client; and the second notification mode uses a first fixed badge on a notification center icon for notification.

According to one or more embodiments of the present disclosure, in the method for message notification provided in the present disclosure, determining the first notification mode based on the number of unread messages of the currently active client comprises: in accordance with a determination that the number of unread messages is less than a first threshold, updating a number badge on the notification center icon, wherein the number on the notification center icon is the number of unread messages; and in accordance with a determination that the number of unread messages is greater than or equal to the first threshold, applying a second fixed badge on the notification center icon for notification.

According to one or more embodiments of the present disclosure, in the method for message notification provided in the present disclosure, a display interface of the currently active client comprises a page of a current document; and the method further comprises: in response to a first operation on the page of the current document, displaying the message in a first display area of the page of the current document, the message being associated with the current document and/or a document other than the current document.

According to one or more embodiments of the present disclosure, in the method for message notification provided in the present disclosure, a display interface of the currently active client comprises a page of a current document, and in accordance with a determination that the current document is in a first operating mode, and in response to a first operation on the message, message content is displayed in a second display area and a location associated with the message content is navigated to.

According to one or more embodiments of the present disclosure, in the method for message notification provided in the present disclosure, a display interface of the currently active client comprises a page of the current document, and in accordance with a determination that the current document is in a second operating mode, and in response to a second operation on the message, the current document is switched to a first operating mode, message content is displayed in a second display area, and a location associated with the message content is navigated to.

According to one or more embodiments of the present disclosure, in the method for message notification provided in the present disclosure, a display interface of the currently active client comprises a page of a current document, and in accordance with a determination that a floating layer is present on the page of the current document, and in response to a third operation on the message, the floating layer is closed and a location associated with message content is navigated to.

According to one or more embodiments of the present disclosure, in the method for message notification provided in the present disclosure, a display interface of the currently active client comprises a page of a current document; and in accordance with a determination that content corresponding to the message is resolved, and in response to a fourth operation on the message, prompt content is displayed in a third display area of the page of the current document, the prompt content being used to indicate that the content corresponding to the message has been resolved.

According to one or more embodiments of the present disclosure, in the method for message notification provided in the present disclosure, a display interface of the currently active client comprises a page of a current document; and in accordance with a determination that content corresponding to the message is re-enabled, the content corresponding to the message is displayed in the page of the current document, and in response to a fifth operation on the content corresponding to the message, content input by the user is received.

According to one or more embodiments of the present disclosure, in the method for message notification provided in the present disclosure, content corresponding to the message is content at a document client of the user; and in accordance with a determination that the content corresponding to the message is re-enabled, an enabling message is displayed at an instant messaging client of the user, the enabling message comprising a document link.

According to one or more embodiments of the present disclosure, in the method for message notification provided in the present disclosure, in accordance with a determination that the message comprises a document link, a document page corresponding to the document link is jumped to in response to a fourth operation on the message.

According to one or more embodiments of the present disclosure, in the method for message notification provided in the present disclosure, in accordance with a determination that the message comprises a document link and a linked document belongs to a document space, a page of the document space is jumped to in response to a fifth operation on the message.

According to one or more embodiments of the present disclosure, in the method for message notification provided in the present disclosure, the method further comprises: for a message of which message content has been displayed at any client, marking the message as read and canceling an unread mark of the message at all clients.

According to one or more embodiments of the present disclosure, the present disclosure provides a method for message notification, comprising: determining a currently active client of a first user and a currently active client of a second user, the currently active client of the first user sharing a same content page with the currently active client of the second user; and notifying a first message in a first notification mode at the content page of the currently active client of the first user, and notifying a second message in a second notification mode at the content page of the currently active client of the second user.

According to one or more embodiments of the present disclosure, in the method for message notification provided in the present disclosure, the first message is determined based on the content page and an identity of the first user, and the second message is determined based on the content page and an identity of the second user.

According to one or more embodiments of the present disclosure, in the method for message notification provided in the present disclosure, further comprising: notifying the first message in a third notification mode at a currently inactive client of the first user.

According to one or more embodiments of the present disclosure, in the method for message notification provided in the present disclosure, further comprising: in response to a sharing operation on the content page, creating a notification display area of the message in a shared interface, the notification display area displaying, for a user engaging in sharing, a notification message associated with the user.

According to one or more embodiments of the present disclosure, the present disclosure provides an apparatus for message notification, comprising: a first active client determination module configured to determine a currently active client of a user in accordance with a determination that a message is reachable for a plurality of clients of the user; and a first message notification module configured to notify the message in a first notification mode at the currently active client, and notify the message in a second notification mode at a currently inactive client.

According to one or more embodiments of the present disclosure, in the apparatus for message notification provided in the present disclosure, the first notification mode is determined based on the number of unread messages of the currently active client; and the second notification mode uses a first fixed badge on a notification center icon for notification.

According to one or more embodiments of the present disclosure, in the apparatus for message notification provided in the present disclosure, determining the first notification mode based on the number of unread messages of the currently active client comprises: in accordance with a determination that the number of unread messages is less than a first threshold, updating a number badge on the notification center icon, wherein the number on the notification center icon is the number of unread messages; and in accordance with a determination that the number of unread messages is greater than or equal to the first threshold, applying a second fixed badge on the notification center icon for notification.

According to one or more embodiments of the present disclosure, in the apparatus for message notification provided in the present disclosure, a display interface of the currently active client comprises a page of a current document; and the apparatus further comprises: in response to a first operation on the page of the current document, displaying the message in a first display area of the page of the current document, the message being associated with the current document and/or a document other than the current document.

According to one or more embodiments of the present disclosure, in the apparatus for message notification provided in the present disclosure, a display interface of the currently active client comprises a page of a current document, and in accordance with a determination that the current document is in a first operating mode, and in response to a first operation on the message, message content is displayed in a second display area and a location associated with the message content is navigated to.

According to one or more embodiments of the present disclosure, in the apparatus for message notification provided in the present disclosure, a display interface of the currently active client comprises a page of the current document, and in accordance with a determination that the current document is in a second operating mode, and in response to a second operation on the message, the current document is switched to a first operating mode, message content is displayed in a second display area, and a location associated with the message content is navigated to.

According to one or more embodiments of the present disclosure, in the apparatus for message notification provided in the present disclosure, a display interface of the currently active client comprises a page of a current document, and in accordance with a determination that a floating layer is present on the page of the current document, and in response to a third operation on the message, the floating layer is closed and a location associated with message content is navigated to.

According to one or more embodiments of the present disclosure, in the apparatus for message notification provided in the present disclosure, a display interface of the currently active client comprises a page of a current document; and in accordance with a determination that content corresponding to the message is resolved, and in response to a fourth operation on the message, prompt content is displayed in a third display area of the page of the current document, the prompt content being used to indicate that the content corresponding to the message has been resolved.

According to one or more embodiments of the present disclosure, in the apparatus for message notification provided in the present disclosure, a display interface of the currently active client comprises a page of a current document; and in accordance with a determination that content corresponding to the message is re-enabled, the content corresponding to the message is displayed in the page of the current document, and in response to a fifth operation on the content corresponding to the message, content input by the user is received.

According to one or more embodiments of the present disclosure, in the apparatus for message notification provided in the present disclosure, content corresponding to the message is content at a document client of the user; and in accordance with a determination that the content corresponding to the message is re-enabled, an enabling message is displayed at an instant messaging client of the user, the enabling message comprising a document link.

According to one or more embodiments of the present disclosure, in the apparatus for message notification provided in the present disclosure, in accordance with a determination that the message comprises a document link, a document page corresponding to the document link is jumped to in response to a fourth operation on the message According to one or more embodiments of the present disclosure, in the apparatus for message notification provided in the present disclosure, in accordance with a determination that the message comprises a document link and a linked document belongs to a document space, a page of the document space is jumped to in response to a fifth operation on the message.

According to one or more embodiments of the present disclosure, in the apparatus for message notification provided in the present disclosure, for a message of which message content has been displayed at any client, marking the message as read and canceling an unread mark of the message at all clients.

According to one or more embodiments of the present disclosure, the present disclosure provides an apparatus for message notification, comprising: a second active client determination module configured to determine a currently active client of a first user and a currently active client of a second user, the currently active client of the first user sharing a same content page with the currently active client of the second user; and a second message notification module configured to notify a first message in a first notification mode at the content page of the currently active client of the first user, and notify a second message in a second notification mode at the content page of the currently active client of the second user.

According to one or more embodiments of the present disclosure, in the apparatus for message notification provided in the present disclosure, the first message is determined based on the content page and an identity of the first user, and the second message is determined based on the content page and an identity of the second user.

According to one or more embodiments of the present disclosure, in the apparatus for message notification provided in the present disclosure, further comprising: notifying the first message in a third notification mode at a currently inactive client of the first user.

According to one or more embodiments of the present disclosure, in the apparatus for message notification provided in the present disclosure, further comprising: in response to a sharing operation on the content page, creating a notification display area of the message in a shared interface, the notification display area displaying, for a user engaging in sharing, a notification message associated with the user.

According to one or more embodiments of the present disclosure, the present disclosure provides an apparatus for message notification, comprising: one or more processors; and memory for storing one or more programs, that when executed by the one or more processors, cause the one or more processors to implement any of the methods for message notification provided in this disclosure.

According to one or more embodiments of the present disclosure, the present disclosure provides a computer-readable storage medium having a computer program stored thereon. The program, when executed by a processor, implements any of the methods for message notification provided in this disclosure.

The present disclosure further provides a computer program product, the computer program product comprising computer programs or instructions. The computer programs or instructions, when executed by a processor, implements any of the methods for message notification provided in this disclosure.

The above description is only the preferred embodiment of the present disclosure and an explanation of the technical principles used. Those skilled in the art should understand that the scope of the disclosure involved in this disclosure is not limited to the specific combination of the technical features of the above technical solutions, but should also cover other technical solutions formed by any combination of the above technical features or equivalent features without departing from the above disclosure concept. For example, the technical solutions formed by replacing the above features with (but not limited to) technical features with similar functions disclosed in this disclosure.

In addition, although the operations are depicted in a specific order, this should not be understood as requiring these operations to be performed in the specific order shown or in sequential order. Under certain circumstances, multitasking and parallel processing may be advantageous. Similarly, although several specific implementation details are included in the above discussion, these should not be construed as limiting the scope of the present disclosure. Certain features described in the context of individual embodiments may also be implemented in combination in a single embodiment. Conversely, various features described in the context of a single embodiment may also be implemented in a plurality of embodiments individually or in any suitable sub-combination.

Although the subject matter has been described in language specific to structural features and/or methodological logical acts, it should be understood that the subject matter defined in the appended claims is not necessarily limited to the particular features or acts described above.

Rather, the particular features and acts described above are merely example forms of implementation of the claims.

We claim:

1. A method for message notification, comprising:

determining, based on a determination that a message is reachable for a plurality of clients of a user, a currently active client of the user; and notifying the message in a first notification mode at the currently active client, and notifying the message in a second notification mode at a currently inactive client, wherein the first notification mode is a strong reminder notification; and the second notification mode is a weak reminder notification, wherein a display interface of the currently active client comprises a page of a current document; and the method further comprises: displaying prompt content in a third display area of the page of the current document based on a determination that content corresponding to the message is resolved and based on a fourth operation on the message, the prompt content being used to indicate that the content corresponding to the message has been resolved, and resolution of the content corresponding to the message comprising deletion, hiding of the content corresponding to the message or other set invisible states.

2. The method of claim 1, wherein the first notification mode is determined based on a number of unread messages of the currently active client; and the second notification mode uses a first fixed badge on a notification center icon for notification.

3. The method of claim 2, wherein determining the first notification mode based on the number of unread messages of the currently active client comprises:

updating, based on a determination that the number of unread messages is less than a first threshold, a number badge on the notification center icon, wherein the number badge on the notification center icon is the number of unread messages; and applying, based on a determination that the number of unread messages is greater than or equal to the first threshold, a second fixed badge on the notification center icon for notification.

4. The method of claim 1, further comprising:

displaying, based on a first operation on the page of the current document, the message in a first display area of the page of the current document, the message being associated with the current document and/or a document other than the current document.

5. The method of claim 1, further comprising: displaying, based on a determination that the current document is in a first operating mode, and based on a first operation on the message, message content in a second display area and navigating to a location associated with the message content.

6. The method of claim 1, further comprising: switching, based on a determination that the current document is in a second operating mode, and based on a second operation on the message, the current document to a first operating mode, displaying message content in a second display area, and navigating to a location associated with the message content.

7. The method of claim 1, further comprising: closing a floating layer and navigating to a location associated with message content based on a determination that the floating layer is present on the page of the current document, and based on a third operation on the message.

8. The method of claim 1, further comprising: displaying, based on a determination that content corresponding to the message is re-enabled, the content corresponding to the message in the page of the current document, and receiving content input by the user in response to a fifth operation on the content corresponding to the message.

9. The method of claim 1, wherein content corresponding to the message is content at a document client of the user; and the method further comprises: displaying, based on a determination that the content corresponding to the message is re-enabled, an enabling message at an instant messaging client of the user, the enabling message comprising a document link.

10. The method of claim 1, wherein the method further comprises: jumping to a document page corresponding to a document link based on a determination that the message comprises the document link, based on a fourth operation on the message.

11. The method of claim 1, wherein the method further comprises: jumping to a page of a document space based on a determination that the message comprises a document link and a linked document belongs to the document space, and based on a fifth operation on the message.

12. The method of claim 1, wherein the method further comprises:

marking a particular message of which message content has been displayed at any client, as read and canceling an unread mark of the particular message at all clients.

13. The method of claim 1, wherein the strong reminder notification comprises presenting a significant state change in an existing interface element in a client interface, or adding a new interface element in the client interface to remind, and the weak reminder notification comprises presenting an insignificant state change in the existing interface element in the client interface by a fixed badge.

14. An electronic device, comprising:

one or more processors; and a storage device for storing one or more programs, that when executed by the one or more processors, cause the one or more processors to perform acts comprising:

determining, based on a determination that a message is reachable for a plurality of clients of a user, a currently active client of the user; and notifying the message in a first notification mode at the currently active client, and notifying the message in a second notification mode at a currently inactive client, wherein the first notification mode is a strong reminder notification; and the second notification mode is a weak reminder notification, wherein a display interface of the currently active client comprises a page of a current document; and the method further comprises: displaying prompt content in a third display area of the page of the current document based on a determination that content corresponding to the message is resolved and based on a fourth operation on the message, the prompt content being used to indicate that the content corresponding to the message has been resolved, and resolution of the content corresponding to the message comprising deletion, hiding of the content corresponding to the message or other set invisible states.

15. The electronic device of claim 14, wherein the first notification mode is determined based on a number of unread messages of the currently active client; and the second notification mode uses a first fixed badge on a notification center icon for notification.

16. The electronic device of claim 15, wherein determining the first notification mode based on the number of unread messages of the currently active client comprises:

updating, based on a determination that the number of unread messages is less than a first threshold, a number badge on the notification center icon, wherein the number badge on the notification center icon is the number of unread messages; and applying, based on a determination that the number of unread messages is greater than or equal to the first threshold, a second fixed badge on the notification center icon for notification.

* * * * *